United States Patent [19]

Marchal

[11] Patent Number: 5,405,439
[45] Date of Patent: Apr. 11, 1995

[54] BITUMEN EMULSION

[75] Inventor: Jean L. Marchal, Houpeville, France

[73] Assignee: Esso Societe Anonyme Francaise, France

[21] Appl. No.: 983,573

[22] PCT Filed: Aug. 2, 1991

[86] PCT No.: PCT/EP91/01489

§ 371 Date: Nov. 26, 1993

§ 102(e) Date: Nov. 26, 1993

[87] PCT Pub. No.: WO92/02586

PCT Pub. Date: Feb. 20, 1992

[30] Foreign Application Priority Data

Aug. 8, 1990 [FR] France ............................... 90 10118

[51] Int. Cl.$^6$ ............................................. C08L 95/00
[52] U.S. Cl. ..................... 106/277; 106/273.1; 106/278; 106/284.3; 106/284.03; 252/311.5
[58] Field of Search ................. 106/273.1, 277, 278, 106/284.3, 284.03, DIG. 7; 252/311.5

[56] References Cited

U.S. PATENT DOCUMENTS

| | | | |
|---|---|---|---|
| 3,695,152 | 10/1972 | Graf | 94/23 |
| 3,728,278 | 4/1973 | Tramelli | 252/311.5 |
| 4,370,170 | 1/1983 | Tolonen et al. | 106/277 |
| 4,496,474 | 1/1985 | Reck | 252/311.5 |

FOREIGN PATENT DOCUMENTS 0283246  9/1988  European Pat. Off. ........ C08J 3/02

OTHER PUBLICATIONS

Patent Abstracts of Japan, vol. 12, No. 2223, C507, abstract of JP 63-17960, published Jan. 25, 1988 (KAO Corp).

Primary Examiner—Mark L. Bell
Assistant Examiner—Michael Marcheschi
Attorney, Agent, or Firm—James H. Takemoto

[57] ABSTRACT

A method for preparing a bitumen emulsion which comprises forming the emulsion from bitumen, water, emulsifying agent, inorganic acid and metal salt, said metal being selected from lithium, sodium, potassium, magnesium, calcium and aluminum wherein the bitumen emulsion has a viscosity of at least 200 cst at 25° C., by the steps of: (a) feeding the bitumen into a first static mixer at a temperature above 50° C.; (b) introducing part of the water under pressure into the first static mixer, the pressure being sufficient to prevent vaporization of the water; (c) introducing the emulsifying agent, inorganic acid and metal salt, wherein the metal is selected from lithium, sodium, potassium, magnesium, calcium and aluminium, into the first static mixer; (d) mixing the components in the first static mixer, and then passing the resultant mixture from the first static mixer into at least one other mixer in which the temperature is lower than in the first static mixer and is below the boiling point of water; (e) introducing the remainder of the water into the other mixer(s); and (f) passing the mixture through the other mixer(s) and removing the resulting bitumen emulsion.

12 Claims, No Drawings

BITUMEN EMULSION

This invention relates to bitumen emulsions, especially emulsions having a relatively high viscosity, and to a method for preparing such emulsions.

Bitumen emulsions are used, for example, in road surfacing and repairing. They have advantages over conventional bitumen compositions in that they can be applied at lower temperatures by spraying or other coating techniques. After being applied to the road surface the emulsion breaks and the water present in the emulsion evaporates leaving a coating of bitumen. Thus emulsions provide few environmental problems and can be used on site without the danger of exposing the road-workers to burns and toxic fumes.

The viscosity of a conventional bitumen emulsion depends largely on the amount of bitumen present. Typically the viscosity is relatively low, ranging from 30 cSt at 60 weight percent bitumen to 400 cSt at 70 weight percent bitumen. Low viscosity emulsions have the disadvantage that, after they have been sprayed onto the road surface, the emulsion tends to flow towards the side of the road due to the camber of the road surface, and the bitumen layer has an uneven thickness across the width of the road.

U.S. Pat. No. 3,728,278 gives examples of bitumen emulsions which consist of 67 or 69% bitumen (asphalt), 0.30% amine emulsifying agent, 0.19% hydrochloric acid, 0.05% calcium chloride, with water making up the remainder of the compositions, the percentage being by weight based on the total weight of the emulsion. The emulsions have a Saybolt Furol Viscosity of 55 seconds (120 cSt), i.e. a typical viscosity for a bitumen emulsion.

The viscosity of bitumen emulsion can be increased by increasing the bitumen content of the emulsion, but this has the disadvantage of reducing the stability of the emulsion. This instability can be countered by adding more emulsifying agent but this then results in an increase in the time taken for the emulsion to break after it has been applied to the road surface. Instead of increasing the bitumen content, high molecular weight compounds can be added to the emulsion, such as high molecular weight water soluble polymers. However these have the disadvantage that they are expensive.

The present invention provides, in one aspect, a bitumen emulsion having a viscosity of at least 200 centiStokes at 25° C. comprising by weight based on the total weight of the emulsion:
  (a) 60 to 80% bitumen having a penetration at 25° C. of 20 to 500;
  (b) 0.04 to 3.0% emulsifying agent;
  (c) 0.04 to 3.0% inorganic acid;
  (d) 0.1 to 3.0% metal salt, the metal being selected from lithium, sodium, potassium, magnesium, calcium and aluminium; and
  (e) 15 to 39% water.

The emulsion according to the invention has the advantage that it has a relatively high viscosity without having an increased proportion of bitumen and without the addition of high molecular weight viscosifying agents. Thus it retains the beneficial properties of lower viscosity emulsions, such as stability and fast breaking, is relatively inexpensive to manufacture, and has the advantage that when the emulsion is applied to a road surface the high viscosity limits the flow of the emulsion towards the sides of the road, and provides a bitumen layer of good uniform thickness.

The bitumen employed in the emulsion may be any well-known commercially available bitumen (also known as asphalt) provided it has a penetration at 25° C. of 20 to 500 according to ASTM D946-74. Preferably the bitumen has a penetration of 100 to 300, more preferably 150 to 250; and a Ring and Ball softening point of 35° to 100° C., more preferably 35° to 60° C. The preferred amount of bitumen contained in the emulsion is 64 to 75%, with 66 to 70% being especially preferred. The mean particle diameter of the bitumen in the prepared emulsion is generally in the range of 0.5 to 10 microns, usually 2 to 7 microns.

The emulsifying agent employed is typically a cationic emulsifying agent. Cationic emulsifying agents are well known for use in bitumen emulsions, and suitable examples include amine propane alkyldiamine and modified alkyl diamines. Preferably the amount of emulsifier used is 0.04 to 1.0%, more preferably 0.05 to 0.5%.

The inorganic acid employed is preferably hydrochloric acid. The preferred amount used in 0.04 to 1.0%, more preferably 0.1 to 0.5%.

The metal salt employed is preferably a metal halide, for example a metal chloride. Examples of suitable metal chlorides include calcium, sodium and aluminium chloride; calcium chloride is especially preferred. The amount of metal salt employed is preferably 0.1 to 1.5%, more preferably 0.15 to 1.0%.

The amount of water contained in the emulsion is preferably 20 to 36%.

If desired the emulsion may also contain other additives commonly used in bitumen emulsions, for example a petroleum fluxant.

The high viscosity bitumen emulsion according to the invention is advantageously prepared by a two (or more) stage static mixing process as described in published European patent application 283 246A.

Thus in another aspect the present invention provides a method for preparing a bitumen emulsion having a viscosity of at least 200 centiStokes at 25° C. which comprises:
  (a) feeding bitumen having a penetration at 25° C. of 20 to 500 into a first static mixer at a temperature above 50° C.;
  (b) introducing water under pressure into the first static mixer, the pressure being sufficient to prevent substantial vaporisation of the water, and the weight ratio of water to bitumen in the first static mixer being between 3 and 35 to 1;
  (c) introducing an emulsifying agent, inorganic acid and metal salt, wherein the metal is selected from lithium, sodium, potassium, magnesium, calcium and aluminium, into the first static mixer;
  (d) mixing the components in the first static mixer, and then passing the resultant mixture from the first static mixer into at least one other mixer in which the temperature is lower than in the first static mixer and is below the boiling point of water;
  (e) introducing water into the other mixer(s) in an amount such that the total amount of water present in the resulting emulsion is from 15 to 40% by weight based on the total weight of the emulsion; and
  (f) passing the mixture through the other mixer(s) and removing the resulting bitumen emulsion.

Preferably the said other mixer is also a static mixer.

To facilitate the introduction of the emulsifying agent, inorganic acid and metal salt into the first static mixer, these components may be mixed with the water to be added to the first mixer to form an aqueous solution or "soap". Preferably this soap contains, in addition to the water, from 0.2 to 20%, more preferably from 0.4 to 10% emulsifying agent; from 0.2 to 20%, more preferably from 0.4 to 10% inorganic acid; and from 0.2 to 20%, more preferably from 0.4 to 10% metal salt. If desired, the bitumen may be premixed with the water and/or the emulsifying agent prior to introduction into the first mixer.

If desired, not all the emulsifying agent, acid and metal salt need to be added to the first static mixer, but each of these components may be added in part to the first static mixer and in part to the subsequent other mixer(s). However it is usually beneficial to add all of each component, or at least a major amount, into the first static mixer.

The bitumen is preferably introduced into the first static mixer at a temperature of 100° to 200° C., more preferably 120° to 190° C., and at a pressure of 2 to 80 bars, more preferably 10 to 30 bars. The water or soap is preferably introduced into the same mixer at a temperature of 20° to 70° C., more preferably 30° to 50° C., and also at a pressure of 2 to 80 bars, more preferably 10 to 30 bars. The temperature in the first mixer is usually 70° to 250° C., more preferably 100° to 150° C. A high temperature facilitates the emulsification of the bitumen and water, and the relatively high pressure prevents the water from evaporating.

It is preferred to pass the resultant mixture from the first static mixer directly into the other mixer, which is also preferably a static mixer. The remainder of the water is introduced into this other mixer, preferably cold, for example 5° to 20° C., so that it cools the emulsion enabling the resultant emulsion to exit the other mixer below the boiling point of water. It is also advantageous to operate this other mixer at a reduced pressure relative to the first mixer so that the emulsion emerges from the other mixture at atmospheric pressure.

We have found that by adding the metal salt, for example calcium chloride, to the mixture to be emulsified, preferably by introducing it into the first stage of the multi-stage static mixing process, a bitumen emulsion of significantly higher viscosity than conventional bitumen emulsions can be produced. For example, for a bitumen content from 64 to 70%, the viscosity of the emulsion according to the invention can range from 200 to 10,000 cSt, and for a bitumen content of 66% or more the viscosity is usually in excess of 400 cSt. This is surprising given that, when metal salts such as calcium or sodium chloride are included in bitumen emulsions prepared by conventional methods such as colloid milling, typically in amounts of 0.01 to 0.05 weight percent, their purpose is to decrease the viscosity of the resulting emulsion.

The method according to this aspect of the invention is preferably a two-stage static mixing process. However more than two mixers may be employed if desired, the mixers usually being arranged in series. Further details of the two or more stage static mixing process are given in the above-mentioned EP 283 246A, the disclosure of which is incorporated herein by reference.

The invention will now be illustrated by the following Examples.

EXAMPLE 1

A bitumen emulsion was prepared using a two-stage static mixing process. Both mixers were Kenics mixers of the type described in Chemineers Brochure 800E published by Chemineer Ltd., 1984.

The compositions of the bitumen and soap solution injected into the first static mixer were as follows:

| Bitumen: | |
| --- | --- |
| Amount of bitumen | 690 kg |
| Penetration 25° C./10 mm/5 sec | 198 |
| R & B softening point | 39° C. |
| Temperature | 140° C. |
| Pressure | 25 bars |
| Soap solution: | |
| Amount of soap solution | 12 kg |
| Tallow propane diamine emusifier | 1.5 kg |
| Hydrochloric acid | 1.5 kg |
| Calcium chloride | 1.0 kg |
| Water | 8.0 kg |
| Temperature | 40° C. |
| Pressure | 25 bars |

The mixture was passed through the first static mixer and then fed directly into the second static mixer and 19 kg water at 15° C. added at a pressure of 4 bars. The mixture was passed through the second mixer and the resulting emulsion exited at atmospheric pressure and a temperature of 80° to 90° C.

The properties of the resulting emulsion were measured and compared with those of a bitumen emulsion having the same composition but prepared by a conventional colloid mill method. The results are given in Table 1.

EXAMPLE 2

Example 1 was repeated except that the amount of bitumen in the mixture was reduced to 650 kg and the amount of water introduced to the second mixer was increased to 23 kg.

The properties of the resulting emulsion were measured and compared with those of a bitumen emulsion of the same composition prepared by conventional colloid mill mixing. The results are given in Table 1.

TABLE 1

| | Example 1 | Comparative | Example 2 | Comparative |
| --- | --- | --- | --- | --- |
| Viscosity @ 25° C. (cSt) | 8400 | 300 | 260 | 70 |
| pH | 2.8 | 2.8 | 2.8 | 2.8 |
| 0.63 mm sieve (%) | 0.01 | 0.01 | 0.01 | 0.01 |
| 0.16 mm sieve (%) | 0.05 | 0.05 | 0.05 | 0.05 |
| Settlement 7 days (%) | <5 | <5 | <5 | <5 |
| Breaking index (g) | 70 | 70 | 80 | 80 |

The results show that bitumen emulsions according to the invention have significantly higher viscosities than the conventionally prepared emulsions, but that in other respects the emulsions of the invention retain the same beneficial properties as the comparative conventional emulsions.

I claim:

1. A method for preparing a bitumen emulsion, which comprises forming an emulsion from (i) bitumen having an ASTM D946-74 penetration at 25° C. of 20 to 500, (ii) water in an amount representing from 15% to 39% by weight based on the total weight of the resulting emulsion, (iii) emulsifying agent, (iv) inorganic acid, and (v) metal salt, the metal being selected from lithium, sodium, potassium, magnesium, calcium and aluminium, wherein, the viscosity of the emulsion is increased to at least 200 cSt at 25° C., the emulsion is formed by the steps of:
- (a) feeding the bitumen into a first static mixer at a temperature above 50° C.;
- (b) introducing part of the water under pressure into the first static mixer, the pressure being sufficient to prevent vaporisation of the water;
- (c) introducing the emulsifying agent, inorganic acid and metal salt, wherein the metal is selected from lithium, sodium, potassium, magnesium, calcium and aluminium, into the first static mixer;
- (d) mixing the components in the first static mixer, and then passing the resultant mixture from the first static mixer into at least one other mixer in which the temperature is lower than in the first static mixer and is below the boiling point of water;
- (e) introducing the remainder of the water into the other mixer(s); and
- (f) passing the mixture through the other mixer(s) and removing the resulting bitumen emulsion.

2. A method for preparing a bitumen emulsion, which comprises forming an emulsion from (i) bitumen having an ASTM D946-74 penetration at 25° C. of 20 to 500, (ii) water in an amount representing from 15% to 39% by weight based on the total weight of the resulting emulsion, (iii) emulsifying agent, (iv) inorganic acid, and (v) metal salt, the metal being selected from lithium, sodium, potassium, magnesium, calcium and aluminium, wherein, the viscosity of the emulsion is increased to at least 200 cSt at 25° C., the emulsion is formed by the steps of:
- (a) feeding the bitumen into a first static mixer at a temperature above 50° C.;
- (b) introducing part of the water under pressure into the first static mixer, the pressure being sufficient to prevent vaporisation of the water, there being a greater weight of bitumen then water in the first static mixer;
- (c) introducing the emulsifying agent, inorganic acid and metal salt, wherein the metal is selected from lithium, sodium, potassium, magnesium, calcium and aluminium, into the first static mixer;
- (d) mixing the components in the first static mixer, and then passing the resultant mixture from the first static mixer into at least one other mixer in which the temperature is lower than in the first static mixer and is below the boiling point of water;
- (e) introducing the remainder of the water into the other mixer(s); and
- (f) passing the mixture through the other mixer(s) and removing the resulting bitumen emulsion.

3. A method for preparing a bitumen emulsion, which comprises forming an emulsion from (i) bitumen having an ASTM D946-74 penetration at 25° C. of 20 to 500, (ii) water in an amount representing from 15% to 39% by weight based on the total weight of the resulting emulsion, (iii) emulsifying agent, (iv) inorganic acid, and (v) metal salt, the metal being selected from lithium, sodium, potassium, magnesium, calcium and aluminium, wherein, the viscosity of the emulsion is increased to at least 200 cSt at 25° C., the emulsion is formed by the steps of:
- (a) feeding the bitumen into a first static mixer at a temperature above 50° C.;
- (b) introducing part of the water under pressure into the first static mixer, the pressure being sufficient to prevent vaporisation of the water, and the weight ratio of bitumen to water in the first static mixer being between 3 and 35 to 1;
- (c) introducing the emulsifying agent, inorganic acid and metal salt, wherein the metal is selected from lithium, sodium, potassium, magnesium, calcium and aluminium, into the first static mixer;
- (d) mixing the components in the first static mixer, and then passing the resultant mixture from the first static mixer into at least one other mixer in which the temperature is lower than in the first static mixer and is below the boiling point of water;
- (e) introducing the remainder of the water into the other mixer(s); and
- (f) passing the mixture through the other mixer(s) and removing the resulting bitumen emulsion.

4. A method according to claim 1, 2 or 3, wherein the bitumen, emulsifying agent, inorganic acid and metal salt are introduced in amounts such that the composition of the emulsion includes, by weight based on the total weight of the emulsion:
- (a) 60 to 80% bitumen;
- (b) 0.04 to 3.0% emulsifying agent;
- (c) 0.04 to 3.0% inorganic acid; and
- (d) 0.1 to 3.0% metal salt.

5. A method according to any one of claims 1 to 4, wherein the metal salt is a metal halide.

6. A method according to any preceding claim, wherein the metal of the metal salt is selected from sodium, calcium and aluminium.

7. A method according to any preceding claim, wherein the amount of metal salt in the emulsion is from 0.1 to 1.5% by weight based on the total weight of the emulsion.

8. A method according to any preceding claim, wherein the amount of bitumen in the emulsion is from 64 to 75% by weight based on the total weight of the emulsion.

9. A method according to any preceding claim, wherein the said other mixer is a static mixer.

10. A method according to any preceding claim, wherein the emulsifying agent, inorganic acid, metal salt and water introduced into the first static mixer are mixed together to form an aqueous solution before being introduced into the first static mixer.

11. A method according to any preceding claim, wherein the amounts of the components in the solution in addition to the water by weight based on the total weight of the solution are:
- (a) 0.2 to 20% emulsifying agent;
- (b) 0.2 to 20% inorganic acid; and
- (c) 0.2 to 20% metal salt.

12. A method according to any preceding claim wherein the emulsifying agent is an amine propane alkyldiamine or a modified alkyl diamine.

* * * * *